United States Patent
Moreso et al.

(10) Patent No.: US 12,428,515 B2
(45) Date of Patent: Sep. 30, 2025

(54) ETHYLENE-RICH DIENE BLOCK POLYMER HAVING A RANDOM BLOCK AND A POLYETHYLENE BLOCK

(71) Applicants: COMPAGNIE GENERALE DES ETABLISSEMENTS MICHELIN, Clermont-Ferrand (FR); CENTRE NATIONAL DE LA RECHERCHE SCIENTIFIQUE, Paris (FR); ECOLE SUPERIEURE DE CHIMIE PHYSIQUE ELECTRONIQUE DE LYON, Villeurbanne (FR); UNIVERSITE CLAUDE BERNARD LYON 1, Villeurbanne (FR)

(72) Inventors: Emma Moreso, Clermont-Ferrand (FR); Julien Thuilliez, Clermont-Ferrand (FR); François Jean-Baptiste-Dit-Dominique, Clermont-Ferrand (FR); Christophe Boisson, Tramoyes (FR); Franck D'Agosto, Genas (FR); Nicolas Baulu, Genas (FR); Damien Montarnal, Ruy Montceau (FR)

(73) Assignees: COMPAGNIE GENERAL DES ETABLISSMENTS MICHELIN, Clermont-Ferrand (FR); CENTRE NATIONAL DE LA RECHERCHE SCIENTIFIQUE, Paris (FR); ECOLE SUPERIEURE DE CHIMIE PHYSIQUE ELECTRONIQUE DE LYON, Villeurbanne (FR); UNIVERSITE CLAUDE BERNAD LYON 1, Vitieurbanne (FR)

(*) Notice: Subject to any disclaimer, the term of this patent is extended or adjusted under 35 U.S.C. 154(b) by 772 days.

(21) Appl. No.: 17/632,315

(22) PCT Filed: Jul. 27, 2020

(86) PCT No.: PCT/FR2020/051381
§ 371 (c)(1),
(2) Date: Feb. 2, 2022

(87) PCT Pub. No.: WO2021/023924
PCT Pub. Date: Feb. 11, 2021

(65) Prior Publication Data
US 2022/0332878 A1 Oct. 20, 2022

(30) Foreign Application Priority Data

Aug. 7, 2019 (FR) .................................. 1909032

(51) Int. Cl.
*C08F 297/08* (2006.01)
(52) U.S. Cl.
CPC ...... *C08F 297/083* (2013.01); *C08F 2420/03* (2013.01)
(58) Field of Classification Search
CPC ...... C08F 2/001; C08F 210/02; C08F 236/06; C08F 2420/03; C08F 2500/02; C08F 2500/32; C08F 2500/34; C08F 297/06; C08F 297/08; C08F 297/083
See application file for complete search history.

(56) References Cited

U.S. PATENT DOCUMENTS

| | | | |
|---|---|---|---|
| 2013/0184402 A1* | 7/2013 | Horikawa | C08F 236/06 525/314 |
| 2013/0211010 A1 | 8/2013 | Horikawa et al. | |
| 2018/0355083 A1 | 12/2018 | Lafaquiere et al. | |

FOREIGN PATENT DOCUMENTS

| | | |
|---|---|---|
| EP | 2599809 A1 | 6/2013 |
| WO | 2017093654 A1 | 6/2017 |
| WO | 2019077234 A1 | 4/2019 |

OTHER PUBLICATIONS

International Search Report and Written Opinion, with English translation, mailed Oct. 15, 2020 for International Application No. PCT/FR2020/051381, 9 pages.

\* cited by examiner

*Primary Examiner* — Ana L. Woodward
(74) *Attorney, Agent, or Firm* — Dickinson Wright PLLC

(57) ABSTRACT

A diblock polymer composed of a first block and a second block is provided. The first block is a statistical copolymer comprising units of a 1,3-diene and more than 50 mol % of ethylene units. The second block is a polyethylene with a melting point above 90° C. and a number-average molar mass greater than or equal to 2000 g/mol and less than or equal to 10 000 g/mol. Such a diblock polymer has improved rheology compared to a statistical copolymer of the same microstructure and of the same macrostructure as the first block of the diblock polymer.

13 Claims, No Drawings

ETHYLENE-RICH DIENE BLOCK POLYMER HAVING A RANDOM BLOCK AND A POLYETHYLENE BLOCK

CROSS-REFERENCE TO RELATED APPLICATIONS

This U.S. national phase patent application claims priority to and the benefit of International Patent Application No. PCT/FR2020/051381, filed on Jul. 27, 2020, which claims priority to and the benefit of French patent application no. FR1909032, filed Aug. 7, 2019, the contents of which are incorporated herein by reference in their entirety.

BACKGROUND

1. Technical Field

The field of the present invention is that of diene copolymers that are rich in ethylene units.

2. Related Art

It has been shown that statistical copolymers based on ethylene and 1,3-diene and that are rich in ethylene units exhibit advantageous stiffness, hysteresis, wear and adhesion properties. Reference may be made, for example, to patent applications WO 2014114607 A1, WO 2016012259 A1 and WO 2016087248 A1.

Another advantage of these copolymers is the use of ethylene which is a common and commercially available monomer, which is accessible via the fossil or biological route. Another advantage of these copolymers is the presence of ethylene units along the polymer backbone, which units are much less sensitive than the diene units to oxidizing or thermal-oxidizing degradation mechanisms, which confers better stability and lifetime on the materials.

Controlling the rheology of a polymer is a key parameter in the industrialization and use of a polymer. The manufacture of articles entirely or partly made of a polymer generally requires various operations such as kneading, extrusion, moulding, etc., during which operations the polymer is subjected to a wide range of frequency stresses. The rheology of the polymer must be suitable for these various operations in order to meet the quality criteria of the article to be manufactured and the productivity criteria in the production line of the article. In particular, a high viscosity at low frequency strains is desirable in order to limit the flow phenomena of the polymer. Solutions for increasing the viscosity at low shear rates without affecting the viscosity at higher shear rates are for example described in document WO 99/10421 A1. They consist in crosslinking the polymer by radical reaction or in modifying it with a polyfunctional coupling agent capable of being inserted into C—H bonds. The grafting of an associative function on a polymer is also a solution described in patent application WO 2008099125 A1 for improving the rheological properties of a polymer.

SUMMARY

The applicant has discovered that it is possible to improve the rheological properties of statistical copolymers based on ethylene and on 1,3-diene and that are rich in ethylene units without modifying the mechanical and dynamic or thermal properties thereof.

Thus a first subject of the invention is a diblock polymer composed of a first block and a second block, the first block being a statistical copolymer comprising units of a 1,3-diene and more than 50 mol % of ethylene units, the second block being a polyethylene with a melting point above 90° C. and a number-average molar mass greater than or equal to 2000 g/mol and less than or equal to 10 000 g/mol.

Another subject of the invention is a composition which comprises a diblock polymer in accordance with the invention and another component.

The invention also relates to a process for preparing a diblock polymer in accordance with the invention which comprises the statistical copolymerization of a monomer mixture containing ethylene and a 1,3-diene, then the subsequent polymerization of ethylene.

DETAILED DESCRIPTION

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b). The abbreviation "phr" means parts by weight per hundred parts by weight of elastomer (of the total of the elastomers if several elastomers are present).

The expression "based on" used to define the constituents of a catalytic system or of a composition is understood to mean the mixture of these constituents, or the product of the reaction of a portion or of all of these constituents with one another.

Unless otherwise indicated, the contents of the units resulting from the insertion of a monomer into a copolymer are expressed as molar percentage relative to all of the units that constitute the polymer.

The compounds mentioned in the description can be of fossil origin or be biobased. In the latter case, they may be partially or completely derived from biomass or be obtained from renewable starting materials derived from biomass. Elastomers, plasticizers, fillers and the like are notably concerned.

The polymer in accordance with the invention is a diblock. One of the two blocks which constitutes the diblock polymer and which is designated by the first block is a statistical copolymer which contains ethylene units and units of a 1,3-diene. The second block is a polyethylene.

In a known manner, the term "ethylene unit" is understood to mean a unit which has the moiety —($CH_2$—$CH_2$)—. The ethylene units present in the first block represent more than 50 mol % of the units which constitute the first block. According to any one of the embodiments of the invention, the first block is preferably a statistical copolymer of ethylene and of a 1,3-diene, in which case the monomer units of the first block are those resulting from the copolymerization of the ethylene and the 1,3-diene and are distributed statistically in the first block.

According to the invention, the 1,3-diene of use for the requirements of the invention is just one compound, that is to say just one 1,3-diene, or is a mixture of 1,3-dienes which differ from one another by the chemical structure. The 1,3-diene is preferably 1,3-butadiene or isoprene, more preferentially 1,3-butadiene. Very preferentially, the first block is a statistical copolymer of ethylene and 1,3-butadiene.

In a known manner, a 1,3-diene can be inserted into a growing polymer chain by a 1,4 or 1,2 or even 3,4 insertion in the case of a substituted diene such as isoprene to give rise respectively to the formation of a unit of the 1,3-diene of 1,4 configuration, a unit of the 1,3-diene of 1,2 configuration or of 3,4 configuration. Preferably, the units of the 1,3-diene in the 1,2 configuration and the units of the 1,3-diene in the 3,4 configuration represent more than 50 mol % of the units of the 1,3-diene.

According to one embodiment of the invention, the first block contains units of the 1,3-diene of 1,4 configuration, preferably trans-1,4 configuration. Preferably, the units of the 1,3-diene of trans-1,4 configuration represent more than 50 mol % of the units of the 1,3-diene of 1,4 configuration. More preferentially, the units of the 1,3-diene of trans-1,4 configuration represent 100 mol % of the units of the 1,3-diene of 1,4 configuration.

According to a particularly preferred embodiment of the invention, the first block contains units of the 1,3-diene which contain more than 50 mol % of the units of 1,2 or 3,4 configuration, the balance to 100% of the units of the 1,3-diene being units of trans-1,4 configuration.

According to another particularly preferred embodiment of the invention, in particular when the 1,3-diene is 1,3-butadiene or a mixture of 1,3-dienes, one of which is 1,3-butadiene, the first block further contains 1,2-cyclohexanediyl units or 1,4-cyclohexanediyl units, preferably 1,2-cyclohexanediyl units. The presence of these cyclic structures in the first block results from a very particular insertion of the ethylene and 1,3-butadiene during their copolymerization. The content of 1,2-cyclohexanediyl units and of 1,4-cyclohexanediyl units in the first block varies according to the respective contents of ethylene and 1,3-butadiene in the first block. The first block generally contains less than 10 mol % of 1,2-cyclohexanediyl units and 1,4-cyclohexanediyl units for the highest contents of ethylene in the first block and may contain more than 10% thereof for the lowest contents of ethylene in the first block, for example up to 15%.

As the stiffness of the diblock polymer increases with the content of ethylene units in the first block, a diblock polymer with a particularly high content of ethylene units in the first block may be desired for applications where a high stiffness of the material is required. Preferably, the ethylene units in the first block represent more than 60 mol % of the units which constitute the first block, in which case the first block contains more than 60 mol % of ethylene units. More preferentially, the ethylene units in the first block represent at least 70 mol % of the units which constitute the first block, in which case the first block contains at least 70 mol % of ethylene units.

According to one particular embodiment of the invention, the ethylene units in the first block represent at most 90 mol % of the units which constitute the first block, in which case the first block contains at most 90 mol % of ethylene units.

According to another particular embodiment of the invention, the ethylene units in the first block represent at most 85 mol % of the units which constitute the first block, in which case the first block contains at most 85 mol % of ethylene units.

The first block preferably has a glass transition temperature between −90° C. and −20° C. More preferentially, the glass transition temperature of the first block is between −60° C. and −20° C., advantageously between −50° C. and −30° C. The first block preferably has a number-average molar mass of greater than or equal to 3000 g/mol and less than or equal to 80 000 g/mol.

The second block has the essential feature of being a polyethylene with a number-average molar mass of greater than or equal to 2000 g/mol and less than or equal to 10 000 g/mol. It also has another essential feature of having a melting point above 90° C., preferably above 90° C. and below 140° C. Preferably, the second block is a linear polyethylene.

The diblock polymer can be used in a composition, another subject of the invention, which further comprises another component. The other component may be a filler such as a carbon black or a silica, a plasticizer such as an oil, a crosslinking agent such as sulfur or a peroxide, or an antioxidant. The other component may also be a polymer, in particular an elastomer. The composition may be a rubber composition.

The diblock in accordance with the invention may be prepared according to a process, another subject of the invention, which comprises the statistical copolymerization of a monomer mixture containing ethylene and a 1,3-diene, then the subsequent polymerization of ethylene.

The catalytic system used in the process for synthesizing the block polymer is advantageously a catalytic system based at least on a metallocene of formula (I) and an organomagnesium compound $$P(Cp^1Cp^2)Nd(BH_4)_{(1+y)}\text{---}Li_y(THF)_x \qquad (I)$$

$Cp^1$ and $Cp^2$, which are identical or different, being selected from the group consisting of cyclopentadienyl groups and fluorenyl groups, the groups being substituted or unsubstituted, P being a group bridging the two $Cp^1$ and $Cp^2$ groups and representing a $ZR^1R^2$ group, Z representing a silicon or carbon atom, $R^1$ and $R^2$, which are identical or different, each representing an alkyl group comprising from 1 to 20 carbon atoms, preferably a methyl, y, which is an integer, being equal to or greater than 0, x, which is or is not an integer, being equal to or greater than 0.

In formula (I), the neodymium atom is connected to a ligand molecule consisting of the two $Cp^1$ and $Cp^2$ groups which are connected together by the bridge P. Preferably, the symbol P, denoted by the term bridge, corresponds to the formula $ZR^1R^2$, Z representing a silicon atom, and $R^2$, which are identical or different, representing an alkyl group comprising from 1 to 20 carbon atoms. More preferentially, the bridge P is of formula $SiR^1R^2$, $R^1$ and $R^2$ being identical and as defined above. More preferentially still, P corresponds to the formula $SiMe_2$.

Mention may be made, as substituted cyclopentadienyl and fluorenyl groups, of those which are substituted with alkyl radicals having from 1 to 6 carbon atoms or with aryl radicals having from 6 to 12 carbon atoms. The choice of the radicals is also guided by the accessibility to the corresponding molecules, which are the substituted cyclopentadienes and fluorenes, because the latter are commercially available or can be easily synthesized.

In the present application, in the case of the cyclopentadienyl group, the 2 (or 5) position denotes the position of the carbon atom which is adjacent to the carbon atom to which the bridge P is attached, as is represented in the diagram below.

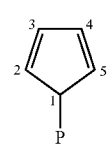

Mention may more particularly be made, as cyclopentadienyl group substituted in the 2 and 5 positions, of the tetramethylcyclopentadienyl group.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the positions of the carbon atoms of the rings as represented in the diagram below, the 9 position corresponding to the carbon atom to which the bridge P is attached.

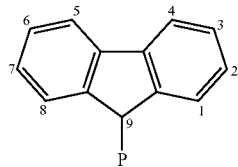

Preferably, $Cp^1$ and $Cp^2$ are identical and are selected from the group consisting of substituted fluorenyl groups and the fluorenyl group. Advantageously, in formula (I) $Cp^1$ and $Cp^2$ each represent a substituted fluorenyl group or a fluorenyl group, preferably a fluorenyl group. The fluorenyl group is of formula $C_{13}H_8$. Preferably, the metallocene is of formula (Ia), (Ib), (Ic), (Id) or (Ie), in which the symbol Flu presents the fluorenyl group of formula $C_{13}H_8$.

$$[\{Me_2SiFlu_2Nd(\mu\text{-}BH_4)_2Li(THF)\}_2] \quad (Ia)$$

$$[Me_2SiFlu_2Nd(\mu\text{-}BH_4)_2Li(THF)] \quad (Ib)$$

$$[Me_2SiFlu_2Nd(\mu\text{-}BH_4)(THF)] \quad (Ic)$$

$$[\{Me_2SiFlu_2Nd(\mu\text{-}BH_4)(THF)\}_2] \quad (Id)$$

$$[Me_2SiFlu_2Nd(\mu\text{-}BH_4)] \quad (Ie)$$

The organomagnesium compound used in the catalytic system as a cocatalyst is a compound which has at least one C—Mg bond. Mention may be made, as organomagnesium compounds, of diorganomagnesium compounds, in particular dialkylmagnesium compounds, and of organomagnesium halides, in particular alkylmagnesium halides. A diorganomagnesium compound is typically of formula $MgR^3R^4$ in which $R^3$ and $R^4$, which may be identical or different, represent a carbon group. Carbon group is understood to mean a group which contains one or more carbon atoms. Preferably, $R^3$ and $R^4$ contain from 2 to 10 carbon atoms. More preferentially, $R^3$ and $R^4$ each represent an alkyl. The organomagnesium compound is advantageously a dialkylmagnesium compound, better still butylethylmagnesium or butyloctylmagnesium, even better still butyloctylmagnesium.

The catalytic system can be prepared conventionally by a process analogous to that described in patent application WO 2007054224. For example, the organomagnesium compound and the metallocene are reacted in a hydrocarbon solvent typically at a temperature ranging from 20° C. to 80° C. for a period of time of between 5 and 60 minutes. The catalytic system is generally prepared in an aliphatic hydrocarbon solvent, such as methylcyclohexane, or an aromatic hydrocarbon solvent, such as toluene.

The metallocene used for preparing the catalytic system can be in the form of a crystalline or non-crystalline powder, or else in the form of single crystals. The metallocene can be provided in a monomer or dimer form, these forms depending on the method of preparation of the metallocene, as for example is described in patent application WO 2007054224. The metallocene can be prepared conventionally by a process analogous to that described in patent application WO 2007054224, in particular by reaction, under inert and anhydrous conditions, of the salt of an alkali metal of the ligand with a rare earth metal borohydride, in a suitable solvent, such as an ether, for example diethyl ether or tetrahydrofuran, or any other solvent known to a person skilled in the art. After reaction, the metallocene is separated from the reaction byproducts by techniques known to a person skilled in the art, such as filtration or precipitation in a second solvent. In the end, the metallocene is dried and isolated in solid form.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

The catalytic system is generally introduced into the reactor containing the polymerization solvent and the monomers. To achieve the desired macrostructure of the diblock polymer, a person skilled in the art adapts the polymerization conditions, in particular the molar ratio of the organomagnesium compound to the metal Nd constituting the metallocene. The molar ratio may reach the value of 100, knowing that a molar ratio of less than 10 is more favourable for obtaining polymers with high molar masses.

Those skilled in the art also adapt the polymerization conditions and the concentrations of each of the reactants (constituents of the catalytic system, monomers) according to the equipment (devices, reactors) used to carry out the polymerization and the various chemical reactions. As is known to those skilled in the art, the polymerization and also the handling of the monomers, of the catalytic system and of the polymerization solvent(s) take place under anhydrous conditions and under an inert atmosphere. The polymerization solvents are typically aliphatic or aromatic hydrocarbon solvents.

The polymerization is preferably carried out in solution, continuously or batchwise, in an advantageously stirred reactor. The polymerization solvent can be an aromatic or aliphatic hydrocarbon solvent. Mention may be made, as examples of polymerization solvent, of toluene and methylcyclohexane. Advantageously, the polymerization is carried out in solution in a hydrocarbon solvent.

The preparation of the first block is carried out by the copolymerization of the mixture containing ethylene and the 1,3-diene. The polymerization temperature generally varies within a range of from 30° C. to 160° C., preferably from 30° C. to 120° C. During the preparation of the first block, the temperature of the reaction medium is advantageously kept constant during the copolymerization and the total pressure of the reactor is also advantageously kept constant. The preparation of the first block is finished by cutting off the supply of monomers, in particular by a drop in the pressure of the reactor, preferably to around 3 bar.

The preparation of the second block by the subsequent polymerization of ethylene is carried out by applying an ethylene pressure to the reactor, the ethylene pressure being kept constant until the desired consumption of ethylene in order to reach the desired number-average molar mass of the second block. The polymerization of the ethylene is preferably carried out at a temperature identical to that of the preparation of the first block. The polymerization temperature for the preparation of the second block generally varies in a range of from 30° C. to 160° C., preferably from 30° C. to 120° C. The pressure for the preparation of the second block generally varies in a range of from 1 bar to 150 bar and preferentially from 1 bar to 10 bar. The synthesis of the second block is finished when the second block reaches the desired number-average molar mass.

The polymerization can be stopped by cooling the polymerization medium or by adding an alcohol, preferentially an alcohol containing 1 to 3 carbon atoms, for example ethanol. The diblock polymer can be recovered according to conventional techniques known to those skilled in the art, such as, for example, by precipitation, by evaporation of the solvent under reduced pressure or by steam stripping.

The diblock polymer in accordance with the invention which can be prepared according to the process in accordance with the invention exhibits improved rheology compared to the statistical copolymer of the same microstructure and of the same macrostructure as the first block of the diblock polymer. The improvement in the rheology is apparent from a large increase in the viscosity of the polymer at low shear rates (typically less than 10 rad/s), while having a low impact on viscosity at high shear rates (typically greater than 50 rad/s). The improvement in the rheology allows more control of the polymer flow during operations that stress the polymer at low shear rate such as hot extrusion. This result is all the more surprising since it is obtained without modifying the macrostructure of the polymer, or the thermal property which is the glass transition temperature. Indeed, the diblock remains a linear chain like the statistical copolymer of the same microstructure as the first block and it retains the glass transition temperature value of this same statistical copolymer.

In summary, the invention is advantageously implemented according to any one of the following embodiments 1 to 33:

Embodiment 1: Diblock polymer composed of a first block and a second block, the first block being a statistical copolymer comprising units of a 1,3-diene and more than 50 mol % of ethylene units, the second block being a polyethylene with a melting point above 90° C. and a number-average molar mass greater than or equal to 2000 g/mol and less than or equal to 10 000 g/mol.

Embodiment 2: Diblock polymer according to embodiment 1, wherein the first block is a statistical copolymer of ethylene and a 1,3-diene.

Embodiment 3: Diblock polymer according to either one of embodiments 1 and 2, wherein the first block contains more than 60 mol % of ethylene units.

Embodiment 4: Diblock polymer according to any one of embodiments 1 to 3, wherein the first block contains at least 70 mol % of ethylene units.

Embodiment 5: Diblock polymer according to any one of embodiments 1 to 4, wherein the first block contains at most 90 mol % of ethylene units.

Embodiment 6: Diblock polymer according to any one of embodiments 1 to 5, wherein the first block contains at most 85 mol % of ethylene units.

Embodiment 7: Diblock polymer according to any one of embodiments 1 to 6, wherein the first block has a glass transition temperature between −90° C. and −20° C.

Embodiment 8: Diblock polymer according to any one of embodiments 1 to 7, wherein the glass transition temperature of the first block is between −60° C. and −20° C.

Embodiment 9: Diblock polymer according to any one of embodiments 1 to 8, wherein the glass transition temperature of the first block is between −50° C. and −30° C.

Embodiment 10: Diblock polymer according to any one of embodiments 1 to 9, wherein the first block has a number-average molar mass of greater than or equal to 3000 g/mol and less than or equal to 80 000 g/mol.

Embodiment 11: Diblock polymer according to any one of embodiments 1 to 10, wherein the 1,3-diene is 1,3-butadiene or isoprene.

Embodiment 12: Diblock polymer according to any one of embodiments 1 to 11, wherein the 1,3-diene is 1,3-butadiene.

Embodiment 13: Diblock polymer according to any one of embodiments 1 to 12, wherein the 1,3-diene is 1,3-butadiene or a mixture of 1,3-dienes, one of which is 1,3-butadiene, and the first block contains 1,2-cyclohexanediyl units or 1,4-cyclohexanediyl units.

Embodiment 14: Diblock polymer according to any one of embodiments 1 to 13, wherein the 1,3-diene is 1,3-butadiene or a mixture of 1,3-dienes, one of which is 1,3-butadiene, and the first block contains 1,2-cyclohexanediyl units.

Embodiment 15: Diblock polymer according to any one of embodiments 1 to 14, wherein the units of the 1,3-diene in the 1,2 configuration and the units of the 1,3-diene in the 3,4 configuration represent more than 50 mol % of the units of the 1,3-diene.

Embodiment 16: Diblock polymer according to any one of embodiments 1 to 15, wherein the first block contains units of the 1,3-diene of 1,4 configuration.

Embodiment 17: Diblock polymer according to any one of embodiments 1 to 16, wherein the first block contains units of the 1,3-diene of trans-1,4 configuration.

Embodiment 18: Diblock polymer according to embodiment 17, wherein the units of the 1,3-diene of trans-1,4 configuration represent more than 50 mol % of the units of the 1,3-diene of 1,4 configuration.

Embodiment 19: Diblock polymer according to embodiment 17 or 18, wherein the units of the 1,3-diene of trans-1,4 configuration represent 100 mol % of the units of the 1,3-diene of 1,4 configuration.

Embodiment 20: Diblock polymer according to any one of embodiments 1 to 19, wherein the second block is a linear polyethylene.

Embodiment 21: Diblock polymer according to any one of embodiments 1 to 20, wherein the melting point of the second block is above 90° C. and below 140° C.

Embodiment 22: Composition which comprises a diblock polymer according to any one of embodiments 1 to 21 and another component.

Embodiment 23: Process for preparing a diblock polymer according to any one of embodiments 1 to 22 which comprises the statistical copolymerization of a monomer mixture containing ethylene and a 1,3-diene, then the subsequent polymerization of ethylene.

Embodiment 24: Process according to embodiment 23, wherein a catalytic system based at least on a metallocene of formula (I) and an organomagnesium compound is used $$P(Cp^1Cp^2)Nd(BH_4)_{(1+y)}—Li_y(THF)_x \qquad (I)$$

Cp¹ and Cp², which are identical or different, being selected from the group consisting of cyclopentadienyl groups and fluorenyl groups, the groups being substituted or unsubstituted, P being a group bridging the two Cp¹ and Cp² groups and representing a $ZR^1R^2$ group, Z representing a silicon or carbon atom, $R^1$ and $R^2$, which are identical or different, each representing an alkyl group comprising from 1 to 20 carbon atoms, preferably a methyl, y, which is an integer, being equal to or greater than 0, x, which is or is not an integer, being equal to or greater than 0.

Embodiment 25: Process according to embodiment 24, wherein the symbol P corresponds to the formula $ZR^1R^2$, Z representing a silicon atom and $R^1$ and $R^2$, which are identical or different, representing an alkyl group comprising from 1 to 20 carbon atoms.

Embodiment 26: Process according to embodiment 24 or 25, wherein the symbol P is of formula $SiR^1R^2$, $R^1$ and $R^2$, which are identical, representing an alkyl group comprising from 1 to 20 carbon atoms.

Embodiment 27: Process according to any one of embodiments 24 to 26, wherein the symbol P corresponds to the formula $SiMe_2$.

Embodiment 28: Process according to any one of embodiments 24 to 27, wherein Cp¹ and Cp² are identical and are selected from the group consisting of substituted fluorenyl groups and the fluorenyl group.

Embodiment 29: Process according to any one of embodiments 24 to 28, wherein Cp¹ and Cp² are each a fluorenyl group.

Embodiment 30: Process according to any one of embodiments 24 to 29, wherein the metallocene is of formula (Ia), (Ib), (Ic), (Id) or (Ie), wherein the symbol Flu presents the fluorenyl group of formula $C_{13}H_8$.

[{Me₂SiFlu₂Nd(μ-BH₄)₂Li(THF)}₂]           (Ia)

[Me₂SiFlu₂Nd(μ-BH₄)₂Li(THF)]              (Ib)

[Me₂SiFlu₂Nd(μ-BH₄)(THF)]                 (Ic)

[{Me₂SiFlu₂Nd(μ-BH₄)(THF)}₂]              (Id)

[Me₂SiFlu₂Nd(μ-BH₄)]                      (Ie)

Embodiment 31: Process according to any one of embodiments 24 to 30, wherein the organomagnesium compound is a diorganomagnesium compound or an organomagnesium halide.

Embodiment 32: Process according to any one of embodiments 24 to 31, wherein the organomagnesium compound is a dialkylmagnesium compound, preferably butylethylmagnesium or butyloctylmagnesium.

Embodiment 33: Process according to any one of embodiments 24 to 32, wherein the organomagnesium compound is butyloctylmagnesium.

A better understanding of the abovementioned characteristics of the present invention, and also of others, will be obtained on reading the following description of several implementational examples of the invention, given by way of illustration and without limitation.

EXAMPLES

1 Size Exclusion Chromatography (SEC)

High-temperature size exclusion chromatography (HT-SEC) analyses were performed using a Viscotek apparatus (from Malvern Instruments) equipped with 3 columns (PL-gel Olexis 300 mm×7.5 mm (PL1110-6400) from Agilent Technologies) and 3 detectors (refractometer, viscometer and light scattering) to determine the weight-average molar masses ($M_w$), the number-average molar masses ($M_n$) and the dispersity ($Ð=M_w/M_n$).

200 μl of a solution of the sample in 1,2,4-trichlorobenzene at a concentration of 3 mg/ml were eluted in 1,2,4-trichlorobenzene using a flow rate of 1 ml/min at 150° C. The mobile phase was stabilized with 2,6-di(tert-butyl)-4-methylphenol (400 mg/l). The solution of the sample is heated to 150° C. and the injection is carried out hot (150° C.).

The OmniSEC software was used to acquire and analyse the data. The molar masses of the ethylene/1,3-butadiene copolymers synthesized are calculated using a universal calibration curve calibrated using polystyrene standards ($M_p$: 672 to 12 000 000 g/mol) of Polymer Standard Service (Mainz) using refractometer and viscometer detectors.

2 Nuclear Magnetic Resonance (NMR)

High-resolution NMR spectroscopy of the polymers was carried out on a Bruker 400 Avance III spectrometer operating at 400 MHz equipped with a 5 mm BBFO probe for proton NMR and on a Bruker 400 Avance II spectrometer operating at 400 MHz equipped with a 10 mm ¹³C PSEX probe for carbon NMR. The acquisitions are carried out at 363 K. A mixture of tetrachloroethylene (TCE) and deuterated benzene ($C_6D_6$) (2/1 v/v) was used as a solvent. The samples were analyzed at a concentration of 1% by weight for the proton NMR NMR) analyses and 5% by weight for the carbon NMR (¹³C NMR) analyses. The chemical shifts are given in ppm, relative to the proton signal of benzene set at 7.16 ppm and the carbon signal of TCE set at 120.65 ppm. The acquisition sequence used for the ¹³C NMR analysis of a polymer is: Power gated decoupling (proton-decoupled spectrum with NOE) with a pulse angle of 70°, TD=64 K and a delay between pulses of 4.5 s. The number of acquisitions is set at 5120.

High-resolution NMR spectroscopy of the organometallic compounds and of the precursors thereof was carried out on a Bruker 400 Avance III spectrometer operating at 400 MHz equipped with a 5 mm BBFO probe or on a Bruker 500 Avance III spectrometer operating at 500 MHz equipped with a 5 mm BBFO probe. The acquisitions are carried out at 298 K or 340 K in deuterated benzene ($C_6D_6$). The samples were analysed at a concentration of 5% by weight. The chemical shifts are given in ppm, relative to the signal of benzene set at 7.16 ppm and the carbon signal set at 128.06 ppm. For the 2D analyses, the following sequences were used: COSY: Pulse program; cosygpqf "cosy with gradients"; SW: 11 ppm×11 ppm; d1: 2 s; 90° "hard" pulse P1=13 μs and 16 W; Gradient: SMSQ10.100. HSQC: Pulse program; hsqcetgpsi2 "HSQC with gradients"; SW: 11 ppm (¹H)×220 ppm (¹³C); d1: 2 s; 90° "hard" pulse ¹H P1=13 μs and 16 W and ¹³C P2=26 μs and 84 W; Gradient: SMSQ10.100. HMQC: Pulse program; hmqcetgp "HMQC with gradients"; SW: 11 ppm (¹H)×220 ppm (¹³C); d1: 1.47 s; 90° "hard" pulse ¹H P1=13 μs and 16 W and ¹³C P2=26 μs and 84 W; Gradient: SMSQ10.100. HMBC: Pulse program; hmbcqgndqf "HMBC with enhanced gradients for long-range coupling and with low-pass J-filter to suppress one-bond correlations"; SW: 13.3 ppm (¹H)×220 ppm (¹³C); d1: 1.5 s; 90° "hard" pulse ¹H P1=13 μs and 16 W and ¹³C P2=26 μs and 84 W; Gradient: SMSQ10.100. NOESY: Pulse program; noesygpphpp "NOESY with gradients"; SW: 9.6 ppm (¹H); d1: 1.98 s; 90° "hard" pulse P1=13 μs and 16 W; Gradient: SMSQ10.100.

3 Differential Scanning Calorimetry (DSC)

The analyses are carried out on a DSC 3+ device from Mettler Toledo calibrated using indium and water. This device has a temperature range of from −90° C. to 700° C. A computer controls the One Click and STARe device from Mettler Toledo. The samples were analysed according to a dynamic method comprising 9 temperature stages: • Stage 1: 20 to 180° C. (10° C./min), • Stage 2: isothermal 180° C. (5 min), • Stage 3: 180 to −80° C. (−10° C./min), • Stage 4: isothermal −80° C. (5 min), • Stage 5: −80 to 180° C. (10° C./min), • Stage 6: isothermal 180° C. (5 min), • Stage 7: 180 to −80° C. (−10° C./min), • Stage 8: isothermal −80° C. (5 min), • Stage 9: −80 to 180° C. (10° C./min). The first two rises make it possible to erase the thermal history of the sample. The measurements of the glass transition temperature (Tg) and melting point (Tm) are carried out in the $9^{th}$ stage. The $7^{th}$ stage is also retained to obtain information on the crystallization of the sample.

The values of Tg and Tm are determined by applying the data reprocessing of the STARe software from Mettler Toledo. The degree of crystallinity is determined using the ISO 11357-3:2011 standard to measure the temperature and enthalpy of fusion and of crystallization of the polymers used by differential scanning calorimetry (DSC). The reference enthalpy of polyethylene is 293 J/g (source: B. Wunderlich, Thermal Analysis, Academic Press, 1990, 281).

4 Rheological Properties

The analyses are carried out on a MARS 60 rotational rheometer (Thermo Scientific) equipped with a lower plate/Peltier upper oven assembly with an accessible temperature range between −20 and 200° C., and also 8 mm plate-plate geometries. The samples are placed at 150° C. The samples are pressed in the form of discs at 150° C. (thickness 1 to 1.5 mm) for 5 min, then cut with a hollow punch in the form of discs with a diameter of 8 mm. The quantity measured is the elastic modulus (or storage modulus), conventionally denoted by G'. The results are presented in base 100 for each shear rate, the value of 100 being attributed to the reference polymer.

Non-Conforming Example 1: (Reference Polymer)

200 ml of toluene (Biosolve) purified on an MBraun SPS800 system are introduced into a 250 ml inerted round-bottomed flask equipped with an olive magnetic stirrer. 0.28 ml (0.25 mmol) of a solution of BOMAG (0.88 mol/l) are introduced into the round-bottomed flask with stirring. 16 mg (12.5 µmol) of $Me_2Si(C_{13}H_8)_2Nd(BH_4)_2Li \cdot THF$ are then introduced into the round-bottomed flask.

The catalytic solution is introduced via a cannula into a 250 ml reactor under an inert atmosphere at 70° C. The argon overpressure in the reactor is reduced to 0.5 bar then the reactor is pressurized to 4 bar with an ethylene/butadiene mixture of 80/20 mole ratio with stirring at 1000 rpm. The pressure is kept constant in the reactor using a tank containing the ethylene/butadiene mixture.

After a drop in pressure in the tank equivalent to 13 g of monomers, the feed is stopped and the reactor is isolated. When the pressure in the reactor reaches 2.8 bar, the reactor is degassed and the temperature is brought back to 20° C. The polymer solution is precipitated from methanol with stirring in the presence of around 20 mg of 2,2'-methylenebis (6-tert-butyl-4-methylphenol) as an antioxidant. The polymer obtained is dried under vacuum at 70° C. for 4 h. 15 g of polymer are recovered, i.e. a yield of 100%.

Conforming Example 2: (Polymer According to the Invention)

200 ml of toluene (Biosolve) purified on an MBraun SPS800 system are introduced into a 250 ml inerted round-bottomed flask equipped with an olive magnetic stirrer. 0.28 ml (0.25 mmol) of a solution of BOMAG (0.88 mol/l) are introduced into the round-bottomed flask with stirring. 16 mg (12.5 µmol) of $Me_2Si(C_{13}H_8)_2Nd(BH_4)_2Li \cdot THF$ are then introduced into the round-bottomed flask.

The catalytic solution is introduced via a cannula into a 250 ml reactor under an inert atmosphere at 70° C. The argon overpressure in the reactor is reduced to 0.5 bar then the reactor is pressurized to 4 bar with an ethylene/butadiene mixture of 80/20 mole ratio with stirring at 1000 rpm. The pressure is kept constant in the reactor using a tank containing the ethylene/butadiene mixture.

After a drop in pressure in the tank equivalent to 13 g of monomers, the feed is stopped and the reactor is isolated. When the pressure in the reactor reaches 2.8 bar, the reactor is again pressurized to 4 bar using a tank containing only ethylene.

After a drop in pressure in the tank equivalent to the desired amount of ethylene consumed (4 g), the reactor is degassed and the temperature is brought back to 20° C. The polymer solution is precipitated from methanol with stirring in the presence of around 20 mg of 2,2'-methylenebis(6-tert-butyl-4-methylphenol) as an antioxidant. The polymer obtained is dried under vacuum at 70° C. for 4 h. 19 g of polymer are recovered, i.e. a yield of 100%.

The characteristics of the polymers appear in Table 1.

The content of ethylene units, the content of 1,3-butadiene units in 1,2-configuration (1,2 units), in 1,4 configuration (1,4 units) and the content of 1,2-cyclohexanediyl units (cycle units) are expressed as a molar percentage relative to all the units of the polymer.

TABLE 1

| Ex. | ethylene units | 1, 2 units | 1, 4 units | cycle units | Tg (° C.) | Tm (° C.) | Degree (%) of crystallinity | Mn (g/mol) | Đ |
|---|---|---|---|---|---|---|---|---|---|
| 1 | 76.1 | 9.1 | 5.7 | 9.1 | −37 | — | — | 29 000 | 1.8 |
| 2 | 83.6 | 6.0 | 3.8 | 6.6 | −36 | 124 | 12 | 32 300 | 2.9 |

The rheological properties appear in Table 2.

TABLE 2

| Ex. | G' at 0.1 Hz, at 150° C. | G' at 1 Hz, at 150° C. | G' at 10 Hz, at 150° C. |
|---|---|---|---|
| 1 | 100 | 100 | 100 |
| 2 | 4300 | 500 | 200 |

The comparison of Examples 1 and 2 show that the G' value of the diblock measured at low shear rates, typically less than 10 rad/s, is very greatly increased compared to the reference polymer. Indeed, at 0.1 Hz (i.e. 0.6 rad/s) it is 43 times greater than that of the G' of the reference polymer. Even at 1 Hz (i.e. 6 rad/s), the multiplying factor is 5. For high shear rates, typically greater than 50 rad/s, the multiplying factor is much less, for example equal to 2 to 10 Hz (i.e. 62 rad/s).

The use of a diblock polymer according to the invention as a replacement for a statistical polymer indeed allows a large increase in the viscosity of the polymer at low shear rates, while the impact on the viscosity is relatively low at high shear rates. This increase in viscosity at low shear rates makes it possible to limit the flow phenomena of the polymer in the processes for converting the polymer at low shear rates without significant modification of its rheological properties at high shear rates.

The invention claimed is:

1. A diblock polymer composed of a first block and a second block, the first block being a statistical copolymer comprising units of a 1,3-diene and more than 50 mol % of ethylene units, the second block being a polyethylene with a melting point above 90° C. and a number-average molar mass greater than or equal to 2000 g/mol and less than or equal to 10 000 g/mol, wherein the 1,3-diene is 1,3-butadiene or a mixture of 1,3-dienes, one of which is 1,3-butadiene, and the first block contains 1,2-cyclohexanediyl units or 1,4-cyclohexanediyl units.

2. A diblock polymer according to claim 1, wherein the first block is a statistical copolymer of ethylene and a 1,3-diene.

3. A diblock polymer according to claim 1, wherein the first block contains more than 60 mol % of ethylene units.

4. A diblock polymer according to claim 1, wherein the first block contains at most 90 mol % of ethylene units.

5. A diblock polymer according to claim 1, wherein the first block contains at most 85 mol % of ethylene units.

6. A diblock polymer according to claim 1, wherein the first block has a glass transition temperature between −90° C. and −20° C.

7. A diblock polymer according to claim 1, wherein the first block has a number-average molar mass of greater than or equal to 3000 g/mol and less than or equal to 80 000 g/mol.

8. A diblock polymer according to claim 1, wherein the first block contains units of the 1,3-diene in a 1,4 configuration.

9. A diblock polymer according to claim 1, wherein the second block is a linear polyethylene.

10. A composition which comprises a diblock polymer according to claim 1 and another component.

11. A diblock polymer composed of a first block and a second block, the first block being a statistical copolymer comprising units of a 1,3-diene and more than 50 mol % of ethylene units, the second block being a polyethylene with a melting point above 90° C. and a number-average molar mass greater than or equal to 2000 g/mol and less than or equal to 10 000 g/mol, wherein the units of the 1,3-diene in a 1,2 configuration and the units of the 1,3-diene in a 3,4 configuration represent more than 50 mol % of the units of the 1,3-diene.

12. A diblock polymer according to claim 11 in which the 1,3-diene is 1,3-butadiene.

13. A process for preparing a diblock polymer, the diblock polymer composed of a first block and a second block, the first block being a statistical copolymer comprising units of a 1,3-diene and more than 50 mol % of ethylene units, the second block being a polyethylene with a melting point above 90° C. and a number-average molar mass greater than or equal to 2000 g/mol and less than or equal to 10 000 g/mol, and the process including a statistical copolymerization of a monomer mixture containing ethylene and a 1,3-diene, then the subsequent polymerization of ethylene, wherein a catalytic system based at least on a metallocene of formula (I) and an organomagnesium compound is used

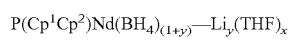

Cp$^1$ and Cp$^2$, which are identical or different, being selected from the group consisting of cyclopentadienyl groups and fluorenyl groups, the groups being substituted or unsubstituted, P being a group bridging the two Cp$^1$ and Cp$^2$ groups and representing a ZR$^1$R$^2$ group, Z representing a silicon or carbon atom, R$^1$ and R$^2$, which are identical or different, each representing an alkyl group comprising from 1 to 20 carbon atoms, y, which is an integer, being equal to or greater than 0, and x being equal to or greater than 0.

* * * * *